Feb. 18, 1930.                R. B. BELL                1,747,967
                            PLANT PROTECTOR
                          Filed Dec. 20, 1928
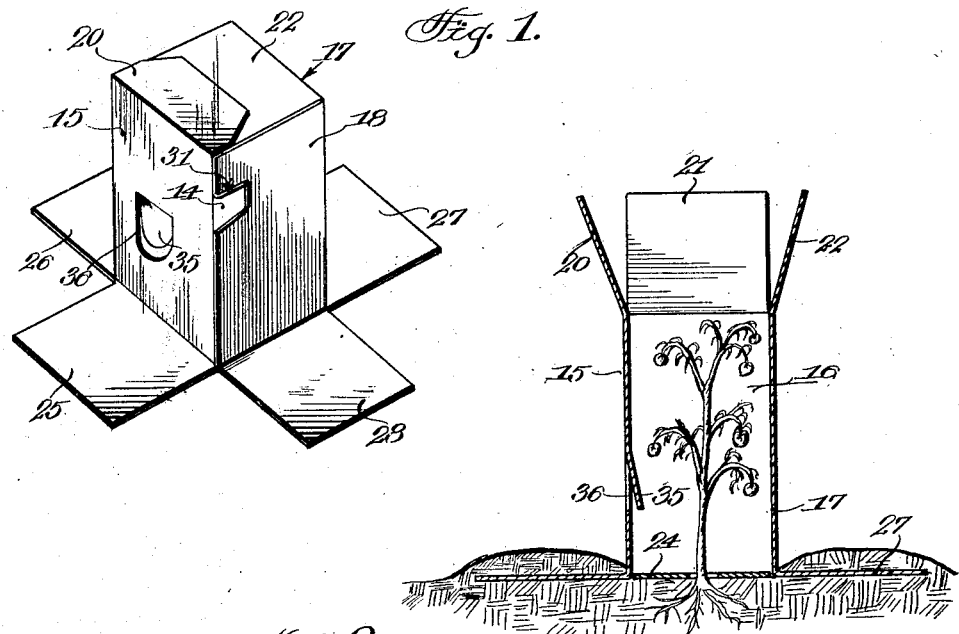
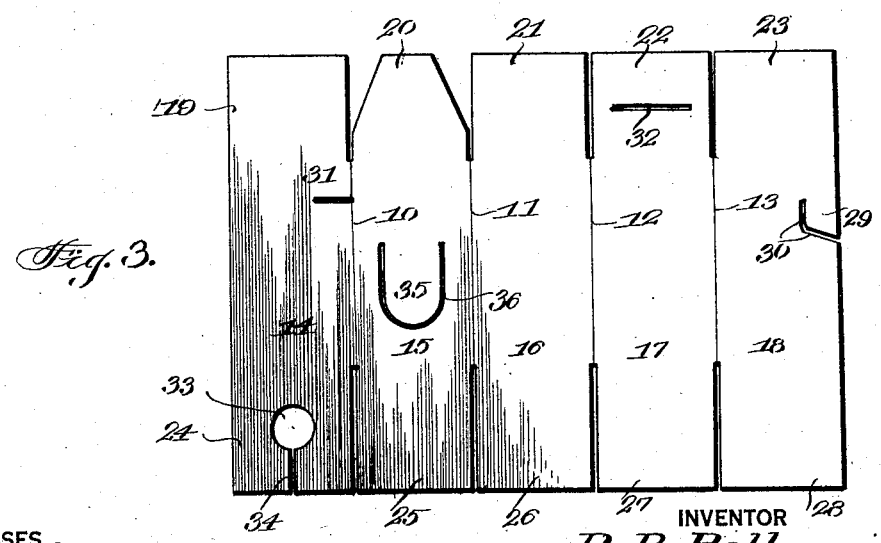
WITNESSES
INVENTOR
R. B. Bell,
BY
ATTORNEY Patented Feb. 18, 1930

1,747,967

UNITED STATES PATENT OFFICE

ROBERT B. BELL, OF MIAMI, FLORIDA

PLANT PROTECTOR

Application filed December 20, 1928. Serial No. 327,278.

This invention appertains to improvements in plant protectors generally, and has for an object to provide a simple and inexpensive, but highly effective and efficient type of such devices, and one which preferably has a mulch combined with the same to give protection to miniature or young plants against the destructive ravages of enemy insect and worm life, as well as against injurious cold weather and frost.

Another object of the invention is to provide a protecting device of the class set forth, which is particularly designed for use in connection with plants in rows or hills, or individual plants, and for this purpose will be made in various sizes and heights.

A further object of the invention is to provide a device as hereinbefore characterized which, while giving full protection to plant lift, will also hold more moisture in the soil about the roots of the plants than has heretofore been possible with known types of such devices.

Another object of the invention is the incorporation within a combined protector and mulch structure, of a means whereby the upper end of the protector proper may be left open to afford an abundance of air and light to the otherwise enclosed plant or plants during mild weather, and which may be easily and readily closed to fully protect the plant or plants whenever the weather becomes severe.

Yet another object of the invention is the provision of a means, whereby a sufficient amount of ventilation will be provided for the protector, whereby to supply fresh air to a plant or plants, otherwise completely enclosed by the protector.

With the foregoing objects and advantages in view, the invention resides in the certain new and useful combination, construction and arrangement of parts as will be hereinafter more fully described, set forth in the appended claims, and illustrated in the accompanying drawing, in which:

Figure 1 is a perspective view of a practical embodiment of the device,

Figure 2 is a vertical section through the same as it appears in use, and

Figure 3 is a plan view of the blank from which the combined protector and mulch is formed.

Referring to the drawing, wherein like characters of reference designate corresponding parts in the several views thereof, the embodiment of the invention, as illustrated therein by way of example, is constituted in a blank of sheet material, such as heavy paper, parchment, cardboard, or the like, which, in the present instance, is formed to provide four vertical lines of fold, 10, 11, 12 and 13 between five side wall portions 14, 15, 16, 17 and 18. If the device is to be of square form in horizontal section, these lines of fold 10, 11, 12 and 13 will be parallel one with respect to the other, and equi-distantly spaced apart, as shown.

Each of the lines of fold 10, 11, 12 and 13 are uniformly split inwardly of their opposite ends, and for a distance equal to the width of each side wall portion 14, 15, 16, 17 and 18 to provide infolding end closure walls 19, 20, 21, 22 and 23 at the upper ends of the side walls 14, 15, 16, 17 and 18, and an equal number of ground engaging wall portions 24, 25, 26, 27 and 28 at the lower ends of the latter, four of which lower end portions, namely the wall portions 25, 26, 27 and 28 being folded in an outward direction to substantially right angular relation to the vertical side wall portions 15, 16, 17 and 18 complemental thereto, and the end portion 24 in an inward direction to a similar angular relation with respect to the complemental side wall portion 14.

When the blank is folded along the lines 10, 11, 12 and 13, the outer side wall 18, at one end of the same, will overlap the other outer side wall 14 at the opposite end thereof, and these overlapping wall portions 18 and 14 are to be secured together by means of a tongue 29 formed by an angular cut 30 in the free side edge of the wall portion 18, being engaged inwardly and downwardly of a horizontal slot 31 formed in the wall portion 14 at a point adjacent the line of fold 10 between the same and the adjoining side wall portion 15. To close the upper end of the body of the protector after the side wall portions 14 and 18 have been secured together, the end flaps 19, 21 and 23 will first be infolded, one upon the other, then the flap 22 upon the uppermost of the same, and lastly the end flap 20 upon the flap 22. The last-named flaps 20 and 22 are to be inter-locked together to secure the same and the other end flaps 19, 21 and 23 in closed position, by the free end of the end flap 20 having its opposite sides cut away on converging lines to form a tapered portion, which is inserted through a slit 32 formed in the end flap 22 for the purpose.

The inturned flap 24, at the lower end of the protector body and forming the mulch to enclose the ground surface about a plant, when the protector is placed in a position of use, is formed to provide a centrally located opening 33 to be engaged over the trunk of the plant to be protected, and a slit 34 leading from the opening 33 through the outer end edge of the flap 24, which slit allows for the engagement of the trunk of the plant within the opening 33 therethrough, and without injury.

A downwardly directed flap 35 is formed by a substantially U-shaped slit 36 in the side wall portion 15 to allow for the ventilation of the interior of the protector body, when the same is set up and otherwise closed to atmosphere. This provides ingress for a sufficient air supply for an enclosed plant without subjecting the same to the extreme weather conditions which may exist exteriorly of the plant protector at any time during its employment.

In the use of the device, as thus constructed and arranged, the body portion thereof will first, be partially engaged over a plant, and in a manner that a sufficient clearance is present between the lower end of the same and the ground surface to admit of the trunk of the plant being passed through the slit 34 and into the opening 33 at the center of the flap 24 forming the mulch, and thereafter lowered to a position of rest, in which positon the outwardly directed flaps 25, 26, 27 and 28 and the inwardly directed flap or mulch 24 will lie flat on the surface of the ground. From this arrangement, it will be obvious that the flap or mulch 24 substantially encloses the lower end of the body of the protector, and surrounds the plant in a manner to thoroughly protect the same against the ravages of mole-crickets, cut worms and other burrowing insects.

To maintain the protector in set position, and against any reasonable possibilty of being blown or accidentally knocked over, the outer lower supporting flaps 25, 26, 27 and 28 are preferably covered with soil, substantially as is shown in Figure 2 of the drawing. This procedure makes the installation of the protector practically permanent, and by reason of the spread of these flaps 25, 26, 27 and 28, together with the inner flap or mulch 24, a greater amount of moisture will be held in the soil beneath the same, and consequently about the roofs of the enclosed plant or plants that would otherwise be the case.

The upper flaps 19, 20, 21, 22 and 23, at the top of the protector body are preferably left open, and maintained in an outwardly directed position in normal weather, so that the plant or plants will receive substantially all the air and light that they would ordinarily receive were the protector not in place, or when cold winds are blowing or when frost is likely to occur, the same will be infolded to a closed position, as hereinbefore explained, to give full protection to the plant or plants.

By thus protecting garden plants, particularly such as beans, egg plants, peppers, potatoes and tomatoes, either individually or in rows, and mellons and cukes in hills, a user of the present device, in a manner as herein indicated for the same, will be enabled to get his or her crops on the market several weeks ahead of the open field planter.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A plant protector comprising a rectangular hollow body of heavy paper or the like and normally open at its upper and lower ends, infolding flaps for closing the upper end of said body as required, outwardly extending supporting flaps at the lower ends of said body, and a flap formed in one of the side walls of said body and adapted to be angularly bent with respect to the said wall to provide an opening therein for ventilating the interior of said body.

2. A plant protector comprising a rectangular hollow body of heavy paper or the like and normally open at its upper and lower ends, infolding flaps for closing the upper end of said body as required, outwardly extending supporting flaps at the lower end of said body, and a mulch carried at the lower end of said body to close the same and to surround a plant or plants housed therein.

3. A plant protector comprising a rectangular hollow body of heavy paper or the like and normally open at its upper and lower ends, infolding flaps for closing the upper end of said body as required, outwardly extending supporting flaps at the lower end of said body, and an inturned flap forming a mulch for enclosing the lower end of said body and adapted to surround a plant or plants housed therein.

4. A plant protector comprising a rectangular body formed from a blank of sheet material folded to form the several side walls thereof, interlocking means formed with the endmost of the side walls at the opposite ends of said blank to secure the same together and to retain the body in shape, infolding flaps formed at the upper ends of the body to close the same as required, outwardly extending flaps formed at the lower end of said body and supporting the same in said position, an inturned flap formed at the lower end of said body and constituting a mulch for enclosing the body end and having an opening therein to engage about the trunk of a plant, and means formed in one of the side walls of the body to ventilate the interior thereof when the upper flaps are infolded to closed position.

ROBERT B. BELL.